United States Patent [19]
Buch et al.

[11] Patent Number: 5,917,540
[45] Date of Patent: Jun. 29, 1999

[54] QUANTITATIVE DATA AND VIDEO DATA ACQUISITION SYSTEM

[75] Inventors: Robert Raymond Buch; Miguel Jose Chavez; David Joseph Romenesko, all of Midland, Mich.

[73] Assignee: Dow Corning Corporation, Midland, Mich.

[21] Appl. No.: 08/799,687

[22] Filed: Feb. 11, 1997

[51] Int. Cl.$^6$ ......................................................... H04N 7/18
[52] U.S. Cl. ............................................. 348/86; 348/135
[58] Field of Search ................................... 348/61, 82, 86, 348/135, 143, 162; 386/46, 52, 61, 84, 95, 117; H04N 7/18

[56] References Cited

U.S. PATENT DOCUMENTS

| | | |
|---|---|---|
| 3,097,263 | 7/1963 | Lintern . |
| 4,248,083 | 2/1981 | Lacy et al. . |
| 4,343,182 | 8/1982 | Pompei . |
| 4,522,787 | 6/1985 | O'Brien et al. . |
| 4,637,735 | 1/1987 | de Ris et al. . |
| 4,641,203 | 2/1987 | Miller ........................................ 386/95 |
| 4,814,868 | 3/1989 | James . |
| 4,847,785 | 7/1989 | Stephens . |
| 4,953,017 | 8/1990 | Ivey et al. . |
| 4,990,312 | 2/1991 | Rucker et al. . |
| 5,068,721 | 11/1991 | Dietrich . |
| 5,121,470 | 6/1992 | Trautman . |
| 5,139,412 | 8/1992 | Kychakoff et al. . |
| 5,140,418 | 8/1992 | Rivamonte . |
| 5,368,471 | 11/1994 | Kychakoff et al. . |
| 5,388,197 | 2/1995 | Rayner . |
| 5,430,833 | 7/1995 | Terenghi . |
| 5,504,522 | 4/1996 | Setogawa . |

OTHER PUBLICATIONS

Standard Test Method for Heat and Visible Smoke Release Rates for Materials and Products Using an Oxygen Consumption Calorimeter American Society for Testing and Materials, E 1354–90, Published Jun. 1990.

A Multi–kilogram Capacity Calorimeter For Heterogeneous Materials, Journal of Research of the National Bureau of Standards, vol. 19, No. 5, Sep.–Oct. 1986.

*Primary Examiner*—Tommy P. Chin
*Assistant Examiner*—Y. Lee
*Attorney, Agent, or Firm*—Alex Weitz

[57] ABSTRACT

A quantitative data and video data acquisition system is provided, including a video imaging device, a video data capture unit, a set of quantitative sensors, a data acquisition unit coupled to the sensors, a data interface coupled to the acquisition unit, and a digital controller programmed to establish a common timing base line, cause the video data capture unit to capture video data, cause the data acquisition unit to acquire quantitative data, and control the video data capture rate and the quantitative data acquisition rate such that concurrent capture of the video data and acquisition of the quantitative data are achieved.

20 Claims, 3 Drawing Sheets

Microfiche Appendix Included
(8 Microfiche, 454 Pages)

QUANTITATIVE DATA AND VIDEO DATA ACQUISITION SYSTEM

Reference is made to a Microfiche Appendix hereto, having a total of 8 microfiche and a total of 454 frames.

BACKGROUND OF THE INVENTION

The present invention relates to synchronized numerical and video data imaging and, more particularly, to simultaneous gathering, synchronization, and subsequent retrieval of video and numerical data to enable simultaneous display of the video and the numerical data along a common time line. A specific embodiment of the present invention relates to the concept of synchronizing video and numerical data sensed from a cone calorimeter.

Churney et al., "A Multi-kilogram Capacity Calorimeter for Heterogeneous Materials," describe a large capacity calorimeter which includes a numerical or quantitative data acquisition system and a television camera coupled to a combustion viewing window. The quantitative data gathered by the acquisition system is not, however, synchronized with the video data gathered by the television camera. Rather, the television camera is merely coupled to a video monitor/recorder to permit viewing/recording of the video image and the quantitative data acquisition system is merely operative to monitor and record experimental data independent of the viewing/recording via the television camera. Churney et al. do not provide any means by which the video image of the combustion and the experimental data may be synchronized and subsequently retrieved to enable simultaneous display of the video data and the experimental quantitative data at a single point along an experimental time line.

An automated interactive record system has been proposed in U.S. Pat. No. 5,121,470, to Trautman. Trautman teaches a record system wherein raw data is organized in chronological fashion as data events along a time line, and wherein image data from a video camera is digitized by a frame grabber, stored on a system disk, associated with specific data events, and displayed relative to the time line as symbols. In this manner, the data events, i.e., numerical/quantitative data, and the data objects, i.e., a video image, are displayed relative to one another along the same time line. However, according to the teachings of the '470 patent, the video image is merely retrievable as an object correlated with a distinct point along the time line. The '470 patent does not suggest a means by which the video image and the raw data may be simultaneously gathered, synchronized, and subsequently retrieved to enable simultaneous display of the video and the numerical data along the time line. Further, according to the teachings of the '470 patent, video images corresponding to distinct points along a time line may not be viewed continuously. Rather, a data object associated with a distinct point along the time line must be manually activated to enable visual display of the data object. The system of the '470 patent does not enable automatic and continuous collection and display of data objects.

Accordingly, there is a need for a numerical data and video data acquisition system which provides for simultaneous gathering, synchronization, and retrieval of video and numerical data to enable simultaneous display of the video and the numerical data along a common time line.

BRIEF SUMMARY OF THE INVENTION

This need is met by the present invention wherein an apparatus and a process are provided for the simultaneous acquisition and display of quantitative data and video data.

In accordance with one illustrative embodiment of the present invention, a quantitative data and video data acquisition system is provided comprising: a video imaging device positioned to obtain a video image of a physical object; a video data capture unit coupled to the video imaging device; at least one quantitative sensor positioned to monitor a characteristic related to the object; a data acquisition unit coupled to the at least one quantitative sensor; a data interface coupled to the data acquisition unit; a digital controller programmed to (i) establish a common timing base line, (ii) cause the video data capture unit to capture video data with corresponding time values from the common timing base line, wherein the video data is captured at a video data capture rate, (iii) cause the data acquisition unit to acquire quantitative data with corresponding time values from the common timing base line, wherein the quantitative data is acquired at a quantitative data acquisition rate, and (iv) control the video data capture rate and the quantitative data acquisition rate such that concurrent capture of the video data and acquisition of the quantitative data are achieved; and a data storage structure coupled to the video data capture unit and the data acquisition unit.

The concurrent capture and acquisition is preferably characterized by an inhibition of video capture dominance, an inhibition of hardware related video data loss, and/or uninterrupted capture of the video data and uninterrupted acquisition of the quantitative data.

The quantitative data and video data acquisition system may further comprise a data display unit coupled to the digital controller wherein the digital controller is further operative to cause captured video data corresponding to a selected time period along the common timing base line to be displayed at the data display unit concurrently with acquired quantitative data corresponding to the selected time period. The acquired quantitative data corresponding to the selected time period may include a plurality of quantitative data points.

The digital controller may be further operative to cause display of a timing marker at the data display unit. The timing marker may be indicative of a current timing point along the common timing base line and the current timing point may correspond to a currently displayed portion of the captured video data and a currently displayed portion of the acquired quantitative data.

The physical object may be positioned within a cone calorimeter. The video imaging device may be positioned to produce an image of the physical object as the physical object undergoes a burn test within the cone calorimeter. Quantitative sensors may be positioned to monitor characteristics as the physical object undergoes a burn test within the cone calorimeter. The quantitative data sensors may be selected from the group consisting of temperature sensors, gas sensors such as carbon monoxide and carbon dioxide sensors, particle sensors, a pressure sensor, a soot analyzer, a smoke analyzer, an oxygen analyzer, and any other sensor appropriate for use in a cone calorimeter.

The data storage structure may comprise a quantitative data reduction unit, a quantitative data buffer, and quantitative data storage unit. The data storage structure may further comprise a video data buffer, and a video data storage unit.

In accordance with another illustrative embodiment of the present invention, a process for the acquisition of quantitative data and video data is provided comprising the steps of: obtaining a video image of a physical object and capturing video data corresponding to the video image, wherein the video data is captured at a video data capture rate with corresponding time values from a common timing base line; monitoring a characteristic related to the physical object and acquiring quantitative data corresponding to the monitored characteristic, wherein the quantitative data is acquired at a quantitative data acquisition rate with corresponding time values from the common timing base line; and controlling the video data capture rate and the quantitative data acquisition rate such that concurrent capture of the video data and acquisition of the quantitative data are achieved.

The process may further comprise the step of subjecting the physical object to a burn test within a cone calorimeter wherein characteristics are monitored during a burn test of the object in the cone calorimeter. The quantitative data may be acquired by an operation selected from the group consisting of temperature sensing, gas sensing such as carbon monoxide and carbon dioxide sensing, particle sensing, pressure sensing, soot analysis, smoke analysis, oxygen analysis, and combinations thereof.

In accordance with yet another illustrative embodiment of the present invention, a process for the storage, and display of quantitative and video data comprises the steps of: obtaining a video image of a physical object; capturing video data corresponding to the video image at a video data capture rate, wherein the video data is captured with corresponding time values from a common timing base line; storing the video data and the corresponding time values within a video data storage structure; monitoring a characteristic related to the physical object; acquiring quantitative data corresponding to the monitored characteristic at a quantitative data acquisition rate, wherein the quantitative data is acquired with corresponding time values from the common timing base line; storing the quantitative data and the corresponding time values within a quantitative data storage structure; controlling the video data capture rate and the quantitative data acquisition rate such that concurrent capture of the video data and acquisition of the quantitative data are achieved; and displaying the stored video data and the stored quantitative data such that quantitative data representative of a selected time period along the common timing base line is displayed concurrently with video data representative of the selected time period.

The video image may be obtained and the related characteristic monitored during initialization and execution of an object test cycle. The object test cycle may comprise heating, igniting, and burning the physical object. The acquired quantitative data corresponding to the selected time period may includes a plurality of quantitative data points.

The process may further comprise the step of displaying a timing marker, wherein the timing marker is included within the display of the stored video data and within the display of the stored quantitative data, wherein the timing marker is indicative of a present timing point along the common timing base line, and wherein the present timing point corresponds to a presently displayed portion of the captured video data.

In accordance with yet another illustrative embodiment of the present invention, a data display system is provided comprising: a data storage unit comprising a set of stored video data and a set of stored quantitative data, wherein the stored video data includes data representative of an image of an object over a predetermined time period, and wherein the stored quantitative data includes data representative of a characteristic of the object over the predetermined time period; a digital display unit comprising a video data display portion and a quantitative data display portion; and a digital controller operative to initiate (i) continuous display of at least a portion of the set of video data in the video data display portion and (ii) display of at least a portion of the set of quantitative data in the quantitative data display portion, wherein the respective displayed portions of the video data and the quantitative data are indicative of the characteristics and the image of the object over a common portion of the predetermined time period.

The digital controller may be further operative to retrieve time values from the quantitative data and video data storage unit defining a common timing base line and initiate display of the common timing base line in a common timing base line display portion of the display unit. The digital controller may also be operative to initiate display of a timing marker, wherein the timing marker is indicative of a current timing point along the common timing base line, and wherein the current timing point corresponds to a currently displayed portion of the captured video data and a currently displayed portion of the acquired quantitative data.

Accordingly, it is an object of the present invention to provide a quantitative data and video data acquisition system wherein the video data capture rate and the quantitative data acquisition rate are controlled such that concurrent capture of the video data and acquisition of the quantitative data are achieved.

DETAILED DESCRIPTION OF THE INVENTION

Figure 1:
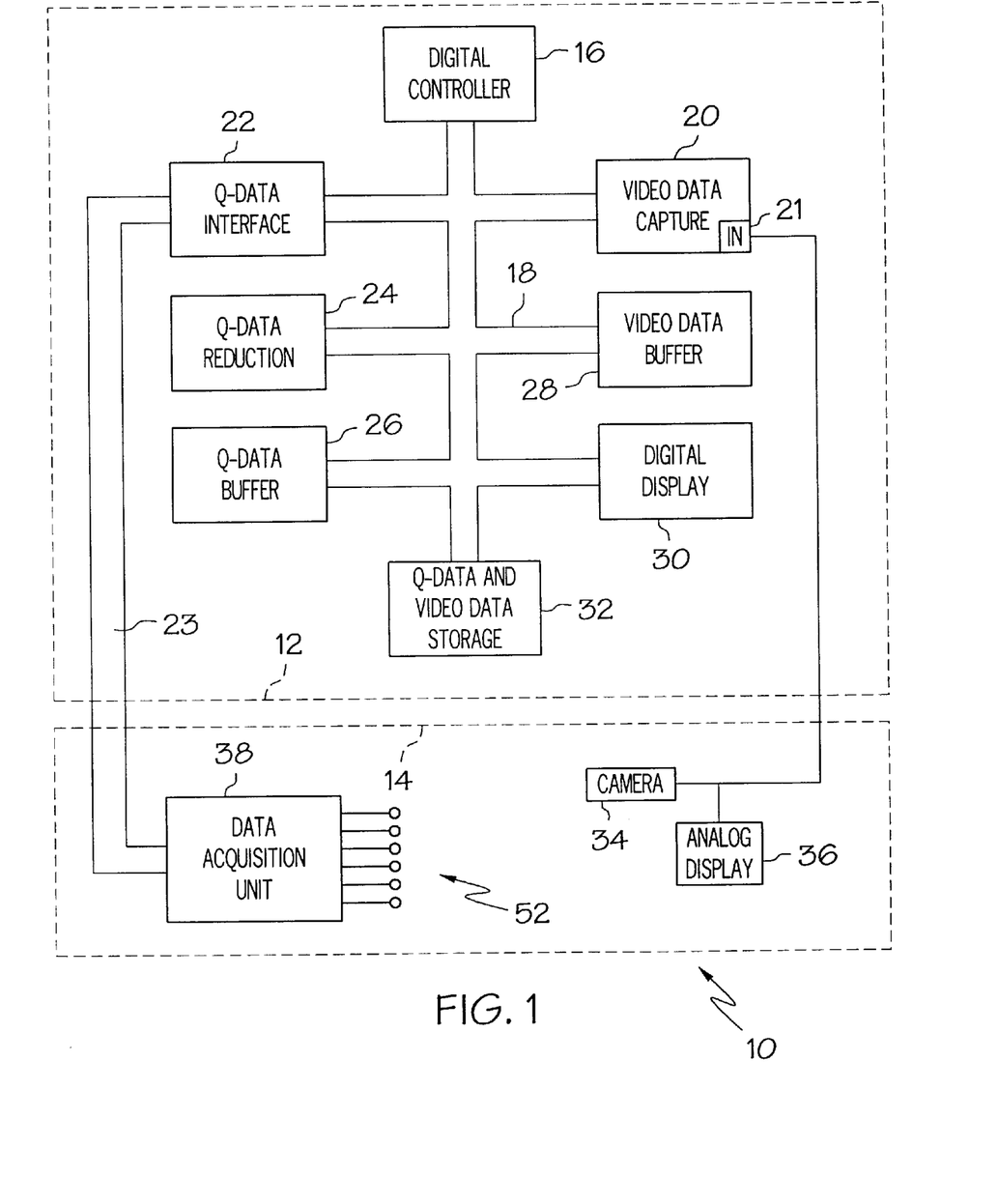
FIG. 1 is a schematic block diagram of a quantitative data and video data acquisition system according to the present invention.
Figure 2:
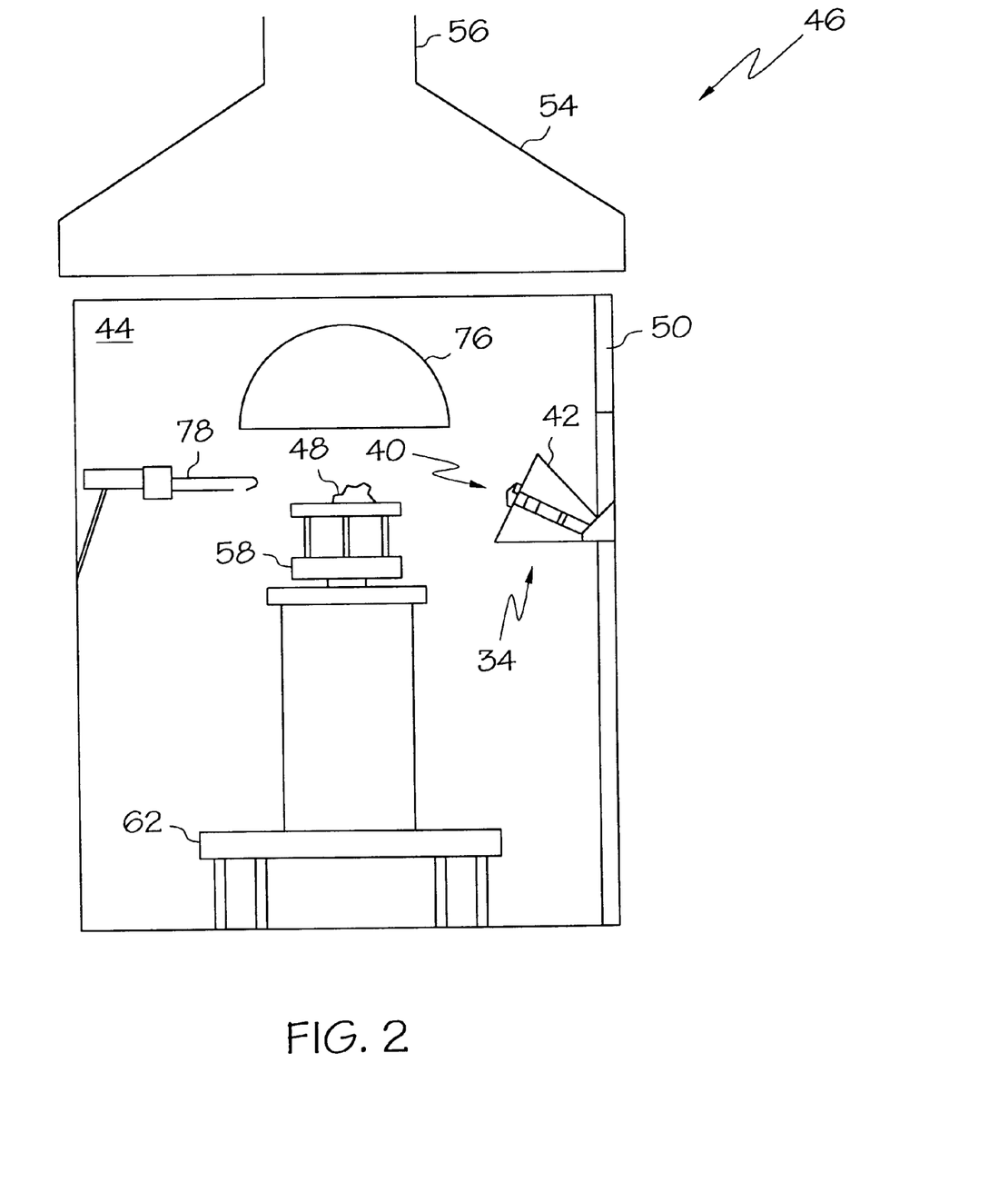
FIG. 2 is a schematic illustration of a cone calorimeter system incorporating a quantitative data and video data acquisition system according to the present invention.
Figure 3:
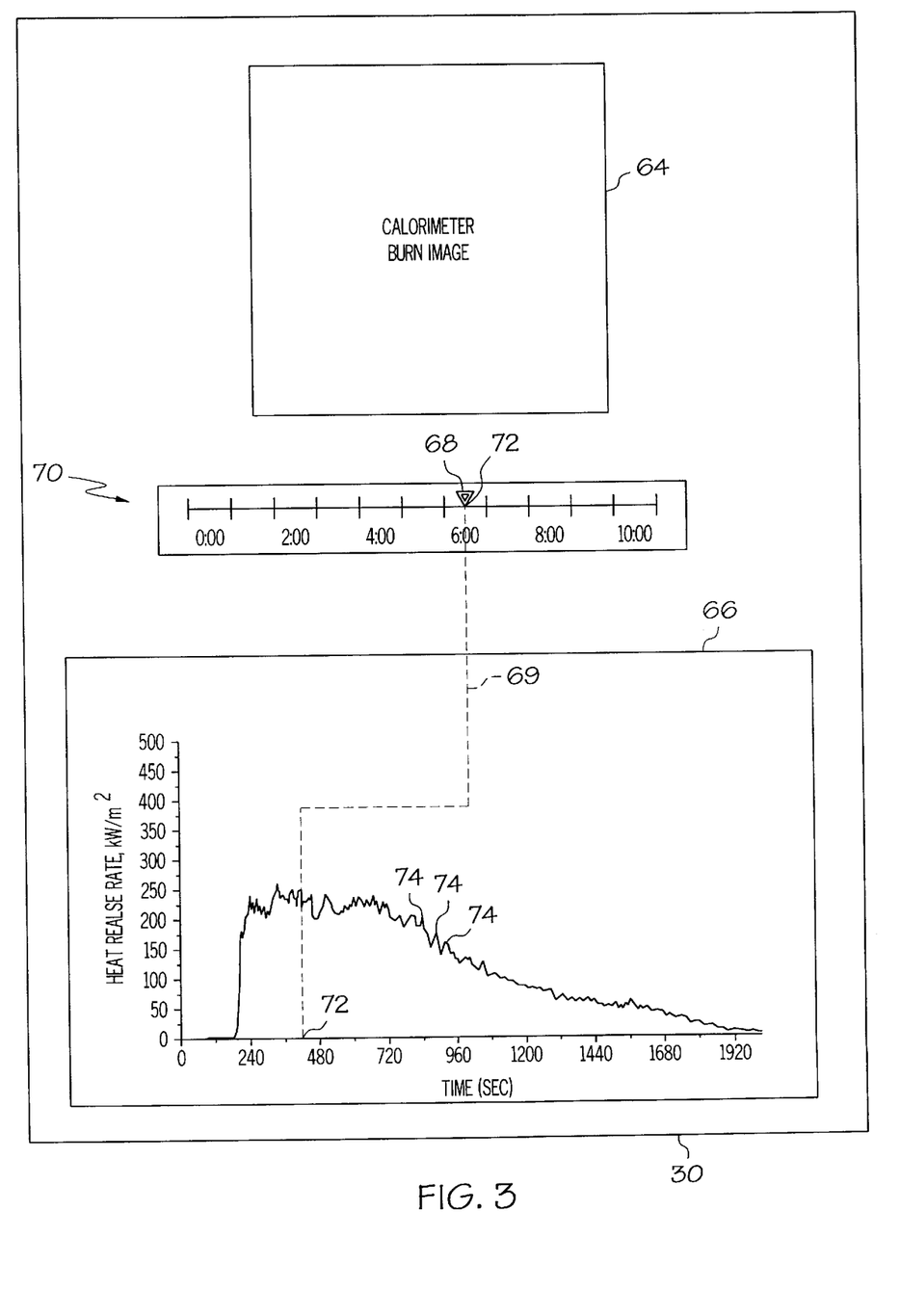
FIG. 3 is an illustration of a data display unit according to the present invention.

A quantitative data and video data acquisition system 10 according to the present invention is described herein with reference to FIGS. 1–3. The quantitative data and video data acquisition system 10 comprises a set of central components 12 and a set of peripheral components 14 in communication with the central components 12. The central components 12 include a digital controller 16 coupled to data, address, and control buses, represented generally by a digital PCI bus 18. A video data capture unit 20, a data interface 22, a quantitative data reduction unit 24, a quantitative data buffer 26, a video data buffer 28, a digital data display unit 30, and a quantitative data and video data storage unit 32 are provided in communication with the digital controller 16 via the digital PCI bus 18 and are controlled thereby according to various operating and applications programs resident in the digital controller 16. The quantitative data reduction unit 24, the quantitative data buffer 26, the video data buffer 28, and the quantitative data and video data storage unit 32 are referenced collectively herein as a data storage structure coupled to the video data capture unit 20. The peripheral components 14 include a video imaging device 34, an analog display 36 coupled to the video imaging device 34, a data acquisition unit 38, and quantitative sensors 52. The analog display 36 is coupled to the video imaging device 34 to provide real time viewing of the object of interest 48.

The video imaging device 34 is positioned to obtain a video image of a physical object of interest. For example, with reference to the embodiment illustrated in FIG. 2, the video imaging device 34 comprises a remote optical sensing head 40 within a protective stainless steel case 42 and positioned within a cone chamber 44 of a cone calorimeter 46 so as to produce an image of a physical object 48 as the physical object 48 undergoes a burn test within the cone calorimeter 46. The cone calorimeter 46 includes a conventional heat source, e.g., a cone heater 76, and an ignitor 78. A cooling assembly (not shown) is provided to protect the sensor from extreme heat conditions within the cone chamber 44. For example, an appropriate cooling assembly comprises a cooling fan and a cooled air duct in communication with the interior of the case 42 and a set of four thermoelectric coolers mounted about the lower collar of the lens of the imaging device 34. The video imaging device 34 and the stainless steel case 42 are connected to an actuator 50 to enable movement of the imaging device 34 within the cone chamber 44. A Panasonic GPKS152 is an example of an appropriate imaging device for the calorimeter embodiment.

The video data capture unit 20 is coupled to the video imaging device 34 via a conventional analog video signal input port 21. The video data capture unit 20 captures video data at a variable video data capture rate and converts the analog video signal to a digital signal that can be cross correlated against other time based data. As will be appreciated by one skilled in the art, the specific video data capture rate selected for a particular application is subject to the control of the digital controller 16 and is based upon the desired quality of the image and the capacity of available hardware to achieve specific capture rates. According to one aspect of the present invention, the video data capture unit 20 comprises a video capture board that directly supports creation, compression, decompression, and playback of various full motion video files. The Smart Video Recorder Professional available from Intel, Santa Clara, Calif., is an example of an appropriate video capture board for use in the present invention.

At least one quantitative sensor 52 is positioned to monitor a characteristic related to the object of interest and is coupled to the data acquisition unit 38. For example, with reference to the calorimeter embodiment of FIG. 2, characteristics of the object 48 are monitored as the object 48 undergoes a burn test within the cone calorimeter 46. As is understood in the art of cone calorimetry and other types of fire calorimetry, e.g., room and furniture calorimetry, one or more quantitative data sensors are positioned along an exhaust path defined by the exhaust hood 54 and exhaust duct 56 of the calorimeter 46 and are selected from the group consisting of temperature sensors, gas sensors such as carbon monoxide and carbon dioxide sensors, particle sensors, a pressure sensor, a soot analyzer, a smoke analyzer, an oxygen analyzer, and any other sensor appropriate for use in a cone calorimeter. Further, a load cell 58 comprises a quantitative sensor positioned within the cone chamber 44. The load cell 58 is coupled to a positioning stage 62.

The data acquisition unit 38 and the data interface 22 communicate via an external bus 23, e.g. an IEEE 488 Bus, to capture quantitative data (Q-data) at a variable quantitative data capture rate. An appropriate data acquisition unit 38 for use in the present invention comprises a Data Acquisition Control Unit 3497A, available from Hewlett Packard, Palo Alto, Calif., and a Hewlett Packard3456AVolt Meter. A 16-bit IEEE4888 interface card by Iotech, Inc. of Cleveland, Ohio, is an example of an appropriate data interface 22 for use in the present invention.

As will be appreciated by one skilled in the art, the video data buffer 28 and the quantitative data buffer 26 are provided to facilitate capture of the video data, acquisition of the quantitative data, and transfer of the captured/acquired data to the quantitative data and video data storage unit 32. Similarly, as will be further appreciated by one skilled in the art, the quantitative data reduction unit 24 is provided to process the quantitative data in accordance with the specific quantitative data and video data acquisition system 10 application.

The digital controller 16 is programmed to establish a common timing base line and cause the video data capture unit 20 to capture video data at a specific video data capture rate with corresponding time values from the common timing base line. The digital controller 16 is also programmed to cause the data acquisition unit 38 to acquire quantitative data at a specific quantitative data acquisition rate with corresponding time values from the common timing base line. The video data capture rate and the quantitative data acquisition rate are selected and controlled such that the application routine associated with the capture of video data and the application routine associated with the acquisition of quantitative data are executed simultaneously. In this manner, concurrent capture of the video data and acquisition of the quantitative data are achieved. Specifically, quantitative data is not lost as a result of video capture dominance, video data is not lost as a result of hardware limitations, and video data capture and quantitative data acquisition are uninterrupted. Uninterrupted capture/acquisition of data as referenced herein comprises data capture and acquisition routines wherein data is captured/acquired at each capture/acquisition interval designated by the respective capture/acquisition rate.

Accordingly, the data capture/acquisition rates must be scaled so that no loss of video or quantitative data occurs. Table 1 represents an illustrative example of appropriately scaled quantitative data acquisition rates and corresponding video data capture rates. The quantitative data acquisition rates given are indicative of the quantitative data acquired at each of a plurality of channels, e.g. thirty (30). Accordingly, the acquisition rates given in Table 1 are the acquisition rates for a single channel or sensor 52. A data point comprises a single data value detected by a single sensor 52. The video data capture rate is illustrated in terms of the frame rate and the frame resolution. The frame rate corresponds to the number of video frames captured per second. The frame resolution corresponds to the number of pixels established for each frame. As will be appreciated by one skilled in the art, the specific quantitative data acquisition rates and the corresponding video data capture rates selected according to the present invention will vary depending upon the capabilities and characteristics of the hardware available at the time of practicing the present invention. The information given in Table 1 is merely an example of one set of appropriate values for a specific embodiment of the present invention.

TABLE 1

| Quantitative Data | Video Data Capture | |
| --- | --- | --- |
| Acquisition Acquisition Rate (per sensor) | Frame Rate (frames/sec) | Frame Resolution (pixels) |
| one data point acquired every one second | 15 | 240 × 180 |

TABLE 1-continued

| Quantitative Data | Video Data Capture | |
|---|---|---|
| Acquisition Acquisition Rate (per sensor) | Frame Rate (frames/sec) | Frame Resolution (pixels) |
| one data point acquired every five seconds | 15 | 320 × 240 |

The appropriate values for the acquisition rate, the frame rate, and the frame resolution are selected by first referring to the specifications, characteristics, and capabilities of the specific system hardware in use. When the video data capture unit 20 comprises the Intel Smart Video Recorder Professional it is also necessary to set a target video data compression rate to control the visual quality of the video display. The product literature explains that selecting an appropriate target data compression rate is an art that depends on a combination of factors relating to system performance of the target playback environment.

The optimum or appropriate values are determined through trial-and-error by choosing a first set of values and noting whether any data loss has occurred, altering the first chosen set of values and noting whether the data loss has been alleviated or aggravated, and continuing to alter the values until all data loss has been alleviated. The appropriate values for the acquisition rate, the frame rate, and the frame resolution are interdependent. For example, as Table 1 shows, if the preferred video window pixel size is increased, then the quantitative data acquisition rate must be decreased in order to prevent loss of quantitative data.

An example of an appropriate computer system for practicing the present invention would be based on the PCI bus 18 and would comprise 32 MB of RAM as the video data buffer 28 and the Q-data buffers 26, an Intel 90 Mhz Pentium CPU as the controller 16, and an SCSI-2 fast and wide Seagate Baracuda hard drive as the quantitative data and video data storage unit 32. The hard drive is available from Seagate Technology, Scotts Valley, Calif., with 4 Gb capacity and burst data rates of approximately 20 Mps (Megabytes/sec) and a sustained data rate of 5–6 Mps as paired with an ADAPTEC 2790 drive controller available from Adaptec, Milpitas, Calif. An example of appropriate source code for practicing the present invention is presented in the Microfiche Appendix hereto.

The digital data display unit 30 is coupled to the digital controller 16. After data is acquired/captured, that display unit 30, in response to the digital controller 16, causes captured video data corresponding to a selected time period along the common timing base line to be displayed at the display unit 30 concurrently with acquired quantitative data corresponding to the selected time period. For example, referring to FIG. 3, the captured video data is displayed in a video data display portion 64 of the display unit 30 and acquired quantitative data is displayed in a quantitative data display portion 66 of the display unit 30. A timing marker 68 is also displayed at the display unit 30. The timing marker 68 is indicative of a current timing point 72 along the common timing base line 70 and the current timing point 72 corresponds to a currently displayed portion of the captured video data, i.e., that portion which is visible in the video data display portion 64, and a currently displayed portion of the acquired quantitative data.

A continuous image, a selected portion of the continuous image corresponding to a specific points along the common timing base line 70, or continuous captured video data corresponding to a selected time period including a plurality of points along the common timing base line 70 may be displayed at the display unit 30 because the stored video data includes video data portions corresponding to a plurality of timing points 72 and time periods within the common timing base line 70. A continuous video image, according to the present specification, comprises a series of video frames displayed at a rate effective to simulate a continuous image. For example, a continuous image is effectively simulated, where a digital controller causes automatic display of a predetermined number of frames per second, e.g. 15 frames per second. In contrast, a continuous image would not be effectively simulated where a human operator manually designates individual frames for successive display. It is contemplated by the present invention that a selected portion of a period, as referenced herein, may include all of that period.

When video data corresponding to a specific time period is displayed in the video data display portion 64, the quantitative data corresponding to the specific time period is simultaneously displayed in the quantitative display portion 66. For example, when video data is displayed in the video data display portion 64 for a five second period along the common timing base line 70, the quantitative data corresponding to that five second period is simultaneously displayed in the quantitative display portion 66. Further, where a plurality of quantitative data points 74 appear in the quantitative data display portion 66, the timing marker 68 includes an extended portion 69 which extends from a location proximate the common timing base line 70 to a location in the quantitative data display portion 66 so as to clearly indicate that portion of the displayed quantitative data corresponding to the displayed video data.

As is illustrated in FIG. 3, the acquired quantitative data corresponding to the selected time period includes a plurality of quantitative data points 74 and a plurality of these quantitative data points 74 appear in the quantitative data display portion 66. However, it is contemplated by the present invention that the quantitative data display portion 66 may merely include a representation of a single data point 74, e.g. a numerical representation of a single data point 74. In which case, it is necessary to display successive single data points 74 in the quantitative data display portion 66 if the time period selected for display includes more than one data point 74.

Each of the plurality of quantitative data points within the set of quantitative data correspond to respective current timing points 72 along the common timing base line 70. Similarly, a portion of the video data corresponds to successive current timing points 72. Accordingly, a portion of the video data corresponding to the respective current timing points 72 for every quantitative data point 74 within the set of quantitative data may be displayed at the display unit 30. It is contemplated by the present invention that the timing points 72 may outnumber the data points 74 and that respective video data portions may be displayed for every timing point 72 defined by the common timing base line 70 because the stored video data includes video data portions corresponding to each timing point 72.

It is also contemplated by the present invention that the digital data display unit 30 may comprise a display unit 30 separate from the quantitative data and video data acquisition system 10 and that quantitative and video data stored in the quantitative data and video data storage unit 32 may be transferred to a portable storage medium and subsequently displayed on the separate display unit via a digital controller in communication with the portable quantitative data and video data storage unit. In this manner, the captured/acquired data may be displayed and viewed at any of a plurality of distinct locations remote from the quantitative data and video data acquisition system 10.

The specific examples of appropriate hardware and source code identified above according to various aspects of the present invention are not intended to limit the scope of the present invention. Rather, the examples are merely illustrative in nature.

It is contemplated that the quantitative data and video data acquisition system of the present invention may be utilized in a variety of applications including calorimetry, medical diagnostics, system diagnostics, object diagnostics, and any other application wherein the concurrent collection of numerical and video data are important.

Having described the invention in detail and by reference to preferred embodiments thereof, it will be apparent that modifications and variations are possible without departing from the scope of the invention defined in the appended claims.

What is claimed is:

1. A quantitative data and video data acquisition system comprising:
   a video imaging device positioned to obtain a video image of a physical object;
   a video data capture unit coupled to said video imaging device;
   at least one quantitative sensor positioned to monitor a characteristic related to said object;
   a data acquisition unit coupled to said at least one quantitative sensor;
   a data interface coupled to said data acquisition unit;
   a digital controller programmed to
      establish a common timing base line,
      execute a first application routine to cause said video data capture unit to capture video data with corresponding time values from said common timing base line, wherein said video data is captured at a video data capture rate,
      execute a second application routine to cause said data acquisition unit to acquire quantitative data with corresponding time values from said common timing base line, wherein said quantitative data is acquired at a quantitative data acquisition rate, and
      control said video data capture rate and said quantitative data acquisition rate such that
         concurrent capture of said video data and acquisition of said quantitative data are achieved, wherein said video data capture rate and said quantitative data acquisition rate are controlled such that said concurrent capture and acquisition is characterized by (i) an inhibition of video capture dominance, (ii) an inhibition of hardware related video data loss, and (iii) uninterrupted capture of said video data and uninterrupted acquisition of said quantitative data, and such that
         said first application routine associated with the capture of video data and said second application routine associated with the acquisition of quantitative data are executed simultaneously; and
   a data storage structure coupled to said video data capture unit and said data acquisition unit.

2. A quantitative data and video data acquisition system as set forth in claim 1 further comprising a data display unit coupled to said digital controller wherein said digital controller is further operative to cause captured video data corresponding to a selected time period along said common timing base line to be displayed at said data display unit concurrently with acquired quantitative data corresponding to said selected time period.

3. A quantitative data and video data acquisition system as set forth in claim 2 wherein said acquired quantitative data corresponding to said selected time period includes a plurality of quantitative data points.

4. A quantitative data and video data acquisition system as set forth in claim 2 wherein said digital controller is further operative to cause display of a timing marker at said data display unit, wherein said timing marker is indicative of a current timing point along said common timing base line, and wherein said current timing point corresponds to a currently displayed portion of said captured video data and a currently displayed portion of said acquired quantitative data.

5. A quantitative data and video data acquisition system as set forth in claim 1 wherein said physical object is positioned within a cone calorimeter.

6. A quantitative data and video data acquisition system as set forth in claim 1 wherein said video imaging device is positioned to produce an image of said physical object as said physical object undergoes a burn test within a cone calorimeter.

7. A quantitative data and video data acquisition system as set forth in claim 1 wherein said quantitative sensor is positioned to monitor said characteristic as said physical object undergoes a burn test within a cone calorimeter.

8. A quantitative data and video data acquisition system as set forth in claim 1 wherein said quantitative data sensor is selected from a group consisting of temperature sensors, gas sensors such as carbon monoxide and carbon dioxide sensors, particle sensors, a pressure sensor, a soot analyzer, a smoke analyzer, an oxygen analyzer, and combinations thereof.

9. A quantitative data and video data acquisition system as set forth in claim I wherein said data storage structure comprises a quantitative data reduction unit, a quantitative data buffer, and quantitative data storage unit.

10. A quantitative data and video data acquisition system as set forth in claim 9 wherein said data storage structure further comprises a video data buffer, and a video data storage unit.

11. A process for the acquisition of quantitative data and video data comprising the steps of;
   obtaining a video image of a physical object and capturing video data corresponding to said video image by executing a first application routine on a vital controller, wherein said video data is captured at a video data capture rate with corresponding time values from a common timing base line;
   monitoring a characteristic related to said physical object and acquiring quantitative data corresponding to said monitored characteristic by executing a second application routine on a digital controller, wherein said quantitative data is acquired at a quantitative data acquisition rate with corresponding time values from said common timing base line; and
   controlling said video data capture rate and said quantitative data acquisition rate such that concurrent capture of said video data and acquisition of said quantitative data are achieved, wherein said video data capture rate and said quantitative data acquisition rate are controlled such that said concurrent capture and acquisition is characterized by (i) an inhibition of video capture dominance, (ii) an inhibition of hardware related video data loss, and (iii) uninterrupted capture of said video data and uninterrupted acquisition of said quantitative data, and such that said first application routine associated with the capture of video data and said second application routine associated with the acquisition of quantitative data are executed simultaneously.

12. A process as set forth in claim 11 further comprising the step of subjecting said physical object to a burn test within a cone calorimeter.

13. A process as set forth in claim 11 wherein said characteristic is monitored during a burn test of said object in a cone calorimeter.

14. A process as set forth in claim 11 wherein said quantitative data is acquired by an operation selected from a group consisting of temperature sensing, gas sensing such as carbon monoxide and carbon dioxide sensing, particle sensing, pressure sensing, soot analysis, smoke analysis, oxygen analysis, and combinations thereof.

15. A process for the storage, and display of quantitative and video data comprising the steps of:
   obtaining a video image of a physical object;
   capturing video data corresponding to said video image at a video data capture rate by executing a first application routine on a digital controller, wherein said video data is captured with corresponding time values from a common timing base line;
   storing said video data and said corresponding time values within a video data storage structure;
   monitoring a characteristic related to said physical object;
   acquiring quantitative data corresponding to said monitored characteristic at a quantitative data acquisition rate by executing a second application routine on a digital controller, wherein said quantitative data is acquired with corresponding time values from said common timing base line;
   storing said quantitative data and said corresponding time values within a quantitative data storage structure;
   controlling said video data capture rate and said quantitative data acquisition rate such that concurrent capture of said video data and acquisition of said quantitative data are achieved, wherein said video data capture rate and said quantitative data acquisition rate are controlled such that said concurrent capture and acquisition is characterized by (i) an inhibition of video capture dominance, (ii) an inhibition of hardware related video data loss, and (iii) uninterrupted capture of said video data and uninterrupted acquisition of said quantitative data, and such that said first application routine associated with the capture of video data and said second application routine associated with the acquisition of quantitative data are executed simultaneously; and
   displaying said stored video data and said stored quantitative data such that quantitative data representative of a selected time period along said common timing base line is displayed concurrently with video data representative of said selected time period.

16. A process as set forth in claim 15 wherein said video image is obtained and said related characteristic is monitored during initialization and execution of an object test cycle.

17. A process as set forth in claim 16 wherein said object test cycle comprises heating, igniting, and burning said physical object.

18. A process as set forth in claim 17 wherein said acquired quantitative data corresponding to said selected time period includes a plurality of quantitative data points.

19. A process as set forth in claim 15 further comprising the step of displaying a timing marker, wherein said timing marker is included within the display of said stored video data and within the display of said stored quantitative data, wherein said timing marker is indicative of a present timing point along said common timing base line, and wherein said present timing point corresponds to a presently displayed portion of said captured video data.

20. A calorimetric quantitative data and video data acquisition system comprising:
   a video imaging device positioned to produce an image of a physical object as said physical object undergoes a burn test within a calorimeter;
   a video data capture unit coupled to said imaging device;
   at least one quantitative sensor positioned to monitor a characteristic related to said object as said physical object undergoes a burn test within said calorimeter;
   a data acquisition unit coupled to said at least one quantitative sensor;
   a data interface coupled to said data acquisition unit;
   a digital controller programmed to
      establish a common timing base line,
      execute a first application routine to cause said video data capture unit to capture video data with corresponding time values from said common timing base line, wherein said video data is captured at a video data capture rate,
      execute a second application routine to cause said data acquisition unit to acquire quantitative data with corresponding time values from said common timing base line, wherein said quantitative data is acquired at a quantitative data acquisition rate, and
      control said video data capture rate and said quantitative data acquisition rate such that concurrent capture of said video data and acquisition of said quantitative data are achieved, wherein said video data capture rate and said quantitative data acquisition rate are controlled such that said concurrent capture and acquisition is characterized by (i) an inhibition of video capture dominance, (ii) an inhibition of hardware related video data loss, and (iii) uninterrupted capture of said video data and uninterrupted acquisition of said quantitative data, and such that said first application routine associated with the capture of video data and said second application routine associated with the acquisition of quantitative data are executed simultaneously; and
   a data storage structure coupled to said video data capture unit and said data acquisition unit.

* * * * *

UNITED STATES PATENT AND TRADEMARK OFFICE
CERTIFICATE OF CORRECTION

PATENT NO. : 5,917,540
DATED : June 29, 1999
INVENTOR(S) : Robert Raymond Buch et al.

It is certified that error appears in the above-identified patent and that said Letters Patent is hereby corrected as shown below:

In Column 10, Line No. 50, "routine on a vital controller"; should read -- routine on a digital controller --.

Signed and Sealed this

Twenty-eighth Day of December, 1999

Attest:

Q. TODD DICKINSON

*Attesting Officer*    *Acting Commissioner of Patents and Trademarks*